US010025701B2

(12) United States Patent
Patnaik et al.

(10) Patent No.: US 10,025,701 B2
(45) Date of Patent: Jul. 17, 2018

(54) APPLICATION PRE-RELEASE REPORT

(71) Applicant: Google Inc., Mountain View, CA (US)

(72) Inventors: Pratyus Patnaik, Los Altos, CA (US); Fergus G. Hurley, London (GB); Niranjan S. Tulpule, San Jose, CA (US); Richard M. Gaywood, London (GB); Boldbaatar Tsend-Ayush, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/207,344

(22) Filed: Jul. 11, 2016

(65) Prior Publication Data
US 2017/0329701 A1 Nov. 16, 2017

Related U.S. Application Data

(60) Provisional application No. 62/337,269, filed on May 16, 2016.

(51) Int. Cl.
*G06F 9/44* (2018.01)
*G06F 11/36* (2006.01)
*G06F 21/57* (2013.01)

(52) U.S. Cl.
CPC ...... *G06F 11/3692* (2013.01); *G06F 11/3612* (2013.01); *G06F 11/3664* (2013.01);
(Continued)

(58) Field of Classification Search
CPC ............. G06F 11/3688; G06F 11/3664; G06F 11/3466
(Continued)

(56) References Cited

U.S. PATENT DOCUMENTS 6,959,431 B1* 10/2005 Shiels ................. G06F 11/3676
714/38.12
7,266,808 B2* 9/2007 Kolawa ............... G06F 11/3664
714/E11.207
(Continued)

OTHER PUBLICATIONS

Balzarotti et al., "Saner: Composing Static and Dynamic Analysis to Validate Sanitization in Web Applications", 2008.*
(Continued)

*Primary Examiner* — Phillip H Nguyen
(74) *Attorney, Agent, or Firm* — Colby Nipper

(57) ABSTRACT

Various embodiments provide an automated testing analysis tool, termed a "pre-release analysis tool", that tests applications for functional and nonfunctional requirements. In at least some embodiments, the pre-release analysis tool can perform both static analysis and dynamic analysis on an application. A report module can provide rich feedback, including actionable feedback, to an application developer in order to enable the developer to make their applications more secure, reliable, efficient, and performant. Actionable feedback can include feedback that suggests various remedial measures that an application developer may put in place in order to improve their applications. Application analysis can be performed in various different categories with actionable feedback provided in each. These different categories can include, by way of example and not limitation, application crashes, performance, security, usability, application statistics, code warnings, localization issues, and network issues.

20 Claims, 9 Drawing Sheets

(52) U.S. Cl.
CPC ...... *G06F 11/3668* (2013.01); *G06F 11/3688* (2013.01); *G06F 21/577* (2013.01); *G06F 2221/033* (2013.01)

(58) Field of Classification Search
USPC .................................. 717/124, 125, 131
See application file for complete search history.

(56) References Cited

U.S. PATENT DOCUMENTS

| | | | | |
|---|---|---|---|---|
| 7,284,274 | B1* | 10/2007 | Walls | G06F 8/70 726/25 |
| 7,596,778 | B2* | 9/2009 | Kolawa | G06F 11/3688 714/38.14 |
| 8,276,123 | B1* | 9/2012 | Deng | G06F 11/3688 714/37 |
| 8,516,449 | B2* | 8/2013 | Artzi | G06F 11/3604 717/124 |
| 8,613,080 | B2* | 12/2013 | Wysopal | G06F 11/3612 726/19 |
| 8,776,026 | B2* | 7/2014 | Candea | G06F 11/3612 717/126 |
| 8,869,274 | B2* | 10/2014 | Hay | G06F 21/561 726/22 |
| 8,935,794 | B2* | 1/2015 | Brake | H04L 63/1433 726/25 |
| 8,997,235 | B2* | 3/2015 | De Barros | H04L 63/1433 726/25 |
| 9,118,713 | B2* | 8/2015 | Bisht | G06F 21/53 |
| 9,189,378 | B1 | 11/2015 | Ryan et al. | |
| 9,811,665 | B1* | 11/2017 | Xu | G06F 21/566 |
| 2011/0283261 | A1* | 11/2011 | Yun | G06F 11/3684 717/124 |
| 2011/0314438 | A1* | 12/2011 | Surazski | G06F 11/0742 717/100 |
| 2012/0054552 | A1* | 3/2012 | Artzi | G06F 11/3688 714/38.1 |
| 2013/0014084 | A1* | 1/2013 | Sahibzada | G06F 11/368 717/124 |
| 2013/0298245 | A1 | 11/2013 | Das | |
| 2014/0201843 | A1 | 7/2014 | Hibbert et al. | |
| 2015/0026665 | A1 | 1/2015 | Chen et al. | |
| 2015/0234699 | A1* | 8/2015 | Surazski | G06F 11/0775 717/124 |

OTHER PUBLICATIONS

Hu et al., "Automating GUI Testing for Android Applications", 2011.*
"International Search Report and Written Opinion", Application No. PCT/US2016/68624, dated Mar. 27, 2017, 12 pages.

* cited by examiner

APPLICATION PRE-RELEASE REPORT

RELATED APPLICATION

This application claims priority under 35 U.S.C. § 119(e) to U.S. Provisional Patent Application Ser. No. 62/337,269 filed May 16, 2016 entitled "Application Pre-Release Report," the disclosure of which is incorporated by reference herein in its entirety.

BACKGROUND

Many application developers, such as mobile app developers, vary in their skill set from amateurs to professionals. Because of this, there is an increased risk of apps with errors, security vulnerabilities, poor energy efficiency, and the like. Existing instrumentation tests check for functional correctness of an application and are not designed to check for things such as security vulnerability, access energy-greedy logic, localization issues, and the like.

SUMMARY

Various embodiments provide an automated testing analysis tool, termed a "pre-release analysis tool", that tests applications for functional and nonfunctional requirements. In at least some embodiments, the pre-release analysis tool can perform both static analysis and dynamic analysis on an application. A report module can provide rich feedback, including actionable feedback, to an application developer in order to enable the developer to make their applications more secure, reliable, efficient, and performant. Actionable feedback can include feedback that suggests various remedial measures that an application developer may put in place in order to improve their applications.

Application analysis can be performed in various different categories with actionable feedback provided in each. These different categories can include, by way of example and not limitation, application crashes, performance, security, usability, application statistics, code warnings, localization issues, and network issues.

This summary is provided to introduce simplified concepts concerning attaching electronic components to interactive textiles, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for testing applications and generating application pre-release reports are described with reference to the following drawings. The same numbers are used throughout the drawings to reference like features and components.

DETAILED DESCRIPTION

Overview

Various embodiments provide an automated testing analysis tool, termed a "pre-release analysis tool", that tests applications for functional and nonfunctional requirements. In at least some embodiments, the pre-release analysis tool can perform both static analysis and dynamic analysis on an application. A report module can provide rich feedback, including actionable feedback, to an application developer in order to enable the developer to make their applications more secure, reliable, efficient, and performant Actionable feedback can include feedback that suggests various remedial measures that an application developer may put in place in order to improve their applications.

Application analysis can be performed in various different categories with actionable feedback provided in each. These different categories can include, by way of example and not limitation, application crashes, performance, security, privacy, usability, application statistics, code warnings, localization issues, and network issues.

In the discussion that follows, an example environment is first described in which the inventive principles can be employed. Following this, an example pre-analysis tool is described in accordance with one or more embodiments. Next, an example report structure is described in which a developer can access a report that includes extensive information regarding an application's analysis. Following this, an example report user interface is described through which an application developer can intuitively and efficiently access information that was developed during static and dynamic testing of their application. Next, example methods and an example computing device are described that can implement the methods and techniques described herein.

Example Environment

Figure 1:
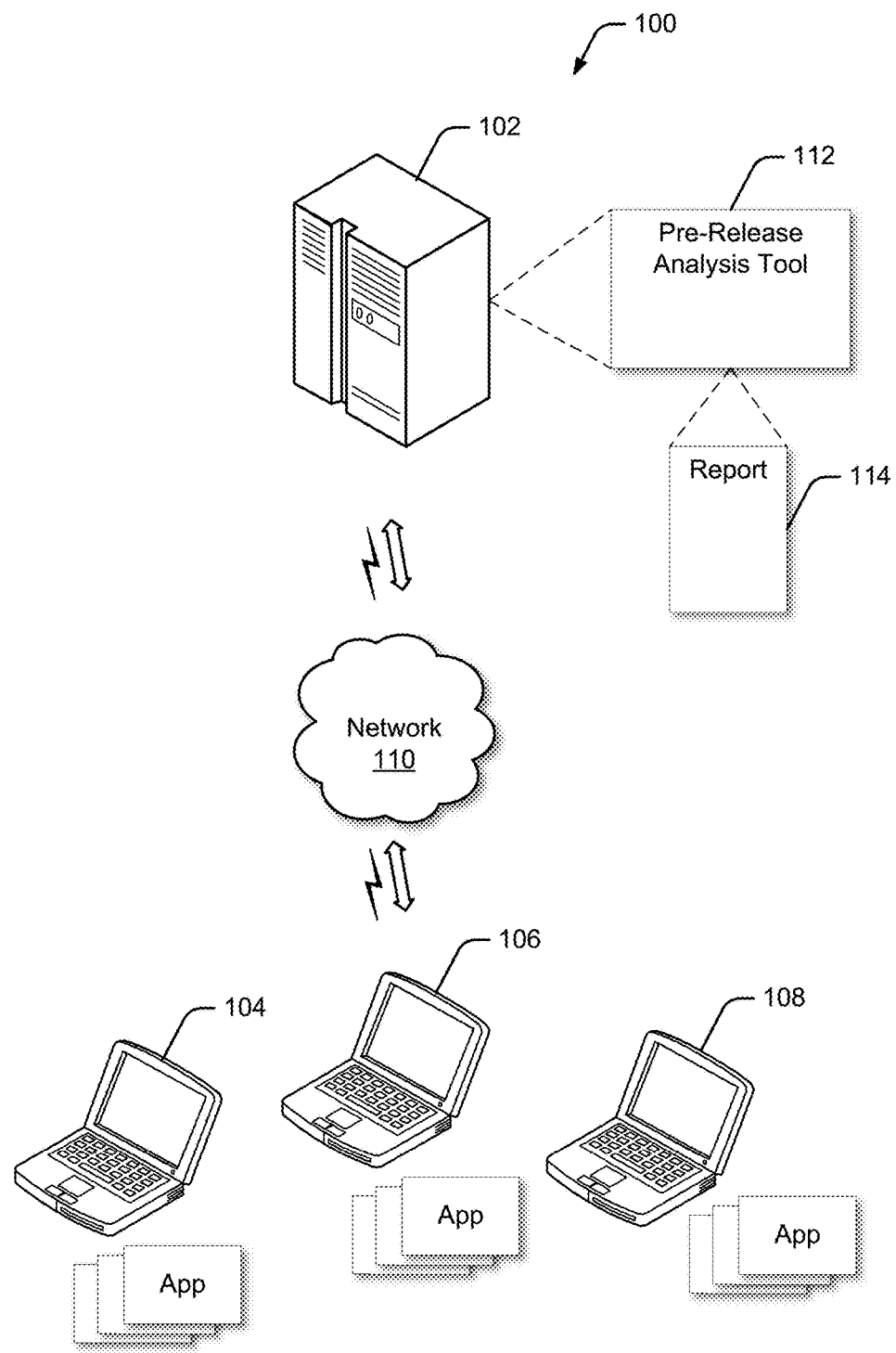
FIG. 1 is an illustration of an example environment in which the techniques described herein may be embodied.

FIG. 1 is an illustration of an example environment 100 in which the pre-release analysis tool can be employed. The illustrated environment 100 includes a server 102, and multiple computing devices 104, 106, and 108. Each of the computing devices 104, 106, and 108 can be associated with an application developer or app developer who develops applications. Any suitable applications can be the subject of analysis as described herein including, by way of example and not limitation, mobile apps for handheld devices such as phones and the like. The computing devices 104, 106, and 108 may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and/or processing resources (e.g., mobile devices).

The server and each of the computing devices includes a processing system that may include one or more processing devices, one or more computer-readable storage media, and various applications embodied on the computer-readable storage media and operable via the processing system to implement corresponding functionality described herein. In the illustrated and described embodiment, computers 104, 106, and 108 can communicate with server 102 by way of a suitably-configured network 110. The network 110 can include any suitable type of network including, by way of example and not limitation, one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

In the illustrated and described embodiment, server 102 serves as a service provider that is configured to communicate with computing devices 104, 106, and 108 over network 110, such as the Internet, to provide a "cloud-based" computing environment.

Generally speaking, a service provider is configured to make various resources available over the network to clients. In some scenarios, users may sign up for accounts that are employed to access corresponding resources from a provider. In this particular example, the server 102 provides a service that performs automated analysis for applications that are developed by application developers. Server 102 provides such service through the use of a pre-release analysis tool 112 that tests applications for functional and nonfunctional requirements. In at least some embodiments, the pre-release analysis tool can perform both static analysis and dynamic analysis on an application, as described below in more detail. The pre-release analysis tool can then produce a report 114 that provides rich feedback, including actionable feedback, to an application developer in order to enable the developer to make their applications more secure, reliable, efficient, and performant. Actionable feedback can include feedback that suggests various remedial measures that an application developer may put in place in order to improve their applications.

The server 102 may also authenticate credentials of a user (e.g., username and password) before granting access to an account and corresponding resources. Other resources may be made freely available, (e.g., without authentication or account-based access). The resources can include any suitable combination of services and/or content typically made available over a network by one or more providers. Some examples of services include, but are not limited to, a web development and management service, a collaboration service, a social networking service, a messaging service, an advertisement service, and so forth. Content may include various combinations of assets, video comprising part of an asset, ads, audio, multi-media streams, animations, images, web documents, E-documents, web pages, applications, device applications, and the like.

In operation, when an application developer develops an application, such as a mobile app, the application can be uploaded to the server 102 for analysis by the pre-release analysis tool 112. Upon completion of the application analysis, the report 114 is generated and can be made available for the application developer. The report is accessed through a robust, informative, and rich user interface that provides comprehensive and detailed information regarding such things as application crashes, performance, security, usability, statistics, code warnings, localization issues, network issues, and the like. In addition, the report provides actionable information that can be used by developer to ensure that their application is more secure, reliable, efficient, and performant. Typically, this process is employed before release of an application. It is to be appreciated and understood, however, that this process can be employed at any time and not necessarily only during pre-release. For example, an application may be released and then subsequently analyzed by the pre-release analysis tool.

Having discussed a system in which pre-release analysis tool 112 can be implemented, consider now a more-detailed discussion of the pre-release analysis tool and its role in analyzing and reporting on applications.

Example Pre-Analysis Tool

Figure 2:
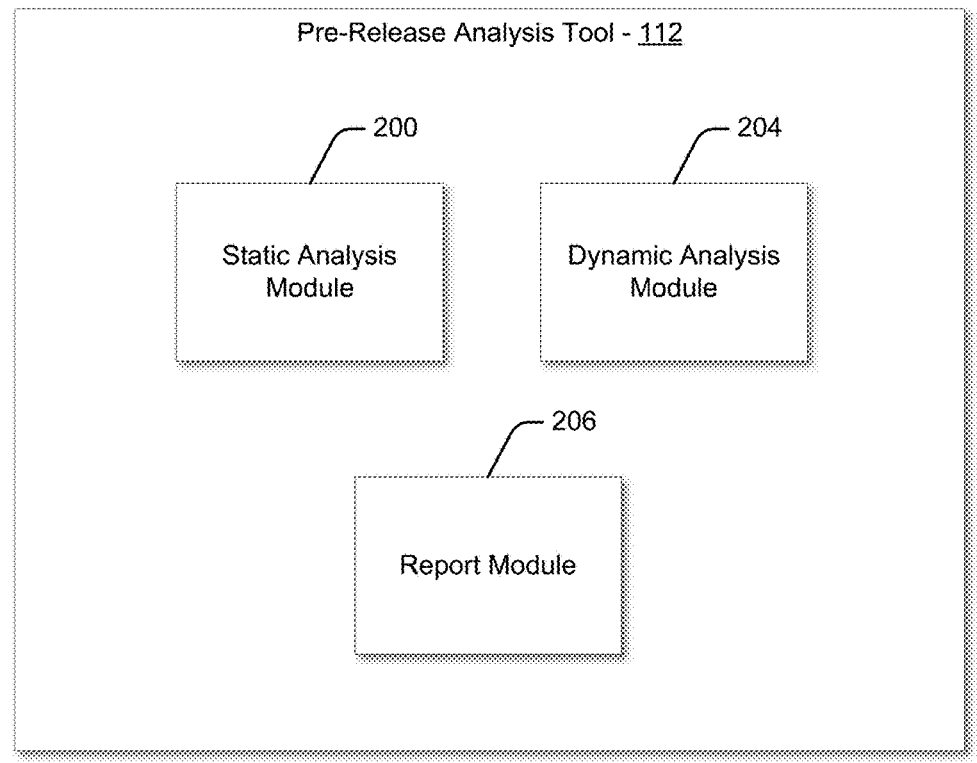
FIG. 2 is an illustration of an example pre-release analysis tool in accordance with one or more embodiments.

FIG. 2 illustrates an example pre-release analysis tool 112 in accordance with one or more embodiments. In the illustrated example, the pre-release analysis tool 112 includes a static analysis module 200, a dynamic analysis module 204 and a report module 206.

Static analysis module 200 is representative of functionality that performs static analysis on an application. Static analysis of an application pertains to analysis that is performed without actually executing or running the application. Static analysis typically analyzes an application in a non-runtime environment. This analysis can detect flaws in an application's inputs and outputs that cannot typically be seen through dynamic analysis. Static analysis can be done by reviewing and analyzing an application's binary code or compiled code to understand the code structure and to help to ensure that the code adheres to any relevant standards. For example, static analysis can analyze an application's size and the size of any artifacts in an application package to ascertain whether assets can be compressed. Static analysis can also enable detection of bad code libraries and flag the use of any private APIs. Static analysis can also be used to detect the use of deprecated APIs so that guidance can be provided to the developer on whether their application will work on particular devices.

In at least some embodiments, static analysis can be used to build a superset of all interconnections between activities inside an application. In a graph called an "activity map", nodes are activities while the edges are intents passed between activities. An activity map is very similar to a physical map and can be used passively or actively. Passive uses include using the activity map to cluster nodes in a graphical catalog and improving the manner in which graphical catalogs of a given application are created. An activity map can be used actively to guide an application crawler during dynamic analysis by using information available in the application. For example, if one knows that clicking a certain button would navigate to an unexplored activity, this information can be used by the application crawler to click that particular button. An activity map depicts an application at its highest level of abstraction. A more detailed representation of an application can be found through a method map. The method map is an extended version of a call graph for an event-based system. It can support specific communication mechanisms such as callbacks and intents. The nodes in a method map are methods and, in at least some embodiments, there are three types of edges which represent three different communication mechanisms: simple method calls, interprocess communications through intents, and callback method registrations. Essentially, the first to edge types show the flow of control area however, callback edges only show the registration of the callback for a specific widget.

Because the method map is created by static analysis, it depicts the approximate behavior of an application. To be more accurate, it shows a superset of what may happen. For instance, since it does not have knowledge about concrete values, it always considers both branches of a conditional expression. The method map is a valuable artifact and can be used for many types of analysis.

Dynamic analysis module 204 is representative of functionality that performs dynamic analysis on an application. Dynamic analysis pertains to testing and evaluation of an application based on execution in a runtime environment. One objective of dynamic analysis is to find errors in an application while it is running. Errors in an application can be detected and exploited and, as such, dynamic analysis seeks to mitigate any potential exposures to exploitation. In the illustrated and described embodiment, dynamic analysis can be performed in a wide variety of ways. For example, dynamic analysis can be used to test an application on a wide variety of physical and virtual devices and with different operating system versions. During such testing, devices can be configured for different locales, such as different geographic regions, and tested for operation within those different locales or regions. During dynamic testing, network traffic data can be captured and analyzed and device metrics and screenshots can be captured.

Dynamic analysis can also test applications for malicious behavior. Vulnerability scanning can be used to detect things such as the use of bad libraries, exposed private keys, and improper SSL. JavaScript injection and penetration tests can also be performed during dynamic analysis, as well as analysis of various data storage parameter issues such as unsafe local data storage, unencrypted storage, whether external storage is used, and the like. Dynamic analysis can also be used to check advertising ID policies, detect API violations, blacklisted advertising SDKs, advertising SDKs that violate particular policies, malformed files such as manifest XML files, transmission of unauthorized data over unencrypted connections, and the like. Dynamic analysis can also test for malware running on the device, check various compliances, whether certificates are valid and being used properly.

Dynamic analysis can also be used to generate screenshots as well as detailed screen metadata that can describe various problems that are detected. This can help to detect such things as overlapping buttons and text, text cut off, material design compliance, and the like.

Accessibility readiness checks can also be performed during dynamic analysis to evaluate truncated texts, color contrast, button sizes, and the like. Further, dynamic analysis can use an automated testing tool, such as a robot, to crawl an application to monitor and evaluate such things as heap dump, activity change, memory leaks, and the like. While an application is crawled, the device locale can be changed and an analysis can be conducted to detect any variations in the user experience that might be caused from the change in the locale such as text cut off, button overlap, and the like. Captured network traffic can be utilized to provide page speed recommendations and spot weak TLS/SSL connections. Wakelock count can also be monitored to assess battery usage.

A robot-based dynamic analysis can be instrumental in testing APIs and developing information such as screenshots, crash lists, execution logs, activity graphs, and the like, that can be used by the report module 206 described just below. Robot-based dynamic analysis can enable an application to be installed on a number of different devices running different operating systems, and for many or all of the activities in an application to be visited and tested in an automated way. This can produce deterministic or reproducible steps for putting an application in a particular state. All of the available actions in a given activity can be explored and information developed to enable detection of air states and application. The automated nature of the robot-based dynamic analysis can greatly reduce application exploration time. For example, the robot can find ways to crash an application and return the required steps for doing so. This, in turn, helps developers that do not fully test their applications manually.

Robot testing, as described above and below, can enable developers to test their application without the need of writing any test scripts. The robot walks the application through various sequence of actions, e.g., using a depth-first search approach with actions including swipe, click, type, and the like, and tries to identify the possible paths within the application that might cause crash or breakage. The actions of the robot can allow reports to be generated that detail application crashes and coverage, as well as the site map of the crawl. This can enable creation of the graphical catalog of a given application by exercising its graphical user interface at runtime. The graphical catalog is essentially a graph where the nodes are different states of activity and the edges are actions used to reach that particular state. A suitably-configured API can be utilized to send events and actions to the graphical user interface of the application simulating a user's interaction with the application. Robotic testing of applications is useful because it can allow, as mentioned above, testing across a matrix of configurations from a variety of clients. It allows the developers to run their tests against a wide variety of dimensions of devices, APIs, locales, and other configurations.

One scenario in which dynamic analysis can be conducted is as follows. A user can initiate robot testing from a desired client and provide the application they wish to test. The client can make a call to a test service, such as one that supports pre-release analysis tool 112 (FIG. 1), to ascertain what test environments are available and appropriate or compatible for the user's application. A catalog can be returned which includes a description of devices with detailed descriptions including the supported API levels. This can be displayed for the user allowing the user to specify a matrix of devices to use during testing. The user can select not only devices, but API levels, locales, portrait orientation, and the like. During testing, the client can periodically poll the test service to retrieve status updates for the user. At the conclusion of the testing, a report, such as the report described below, can be downloaded.

Report module 206 is representative of functionality that receives information from both the static analysis module 200 and dynamic analysis module 204, and creates a robust, informative and comprehensive report for application developers. The report, which is interactive and accessible over a network, enables application developers to review analysis results broken down into various different categories. Each category is then further broken down to convey information at different levels of granularity that are useful for the application developer to understand. The report is presented in an intuitive, easy-to-navigate user interface that guides the developer through the analysis results. As but one example of a report structure, consider the following.

Example Report Structure

Figure 3:
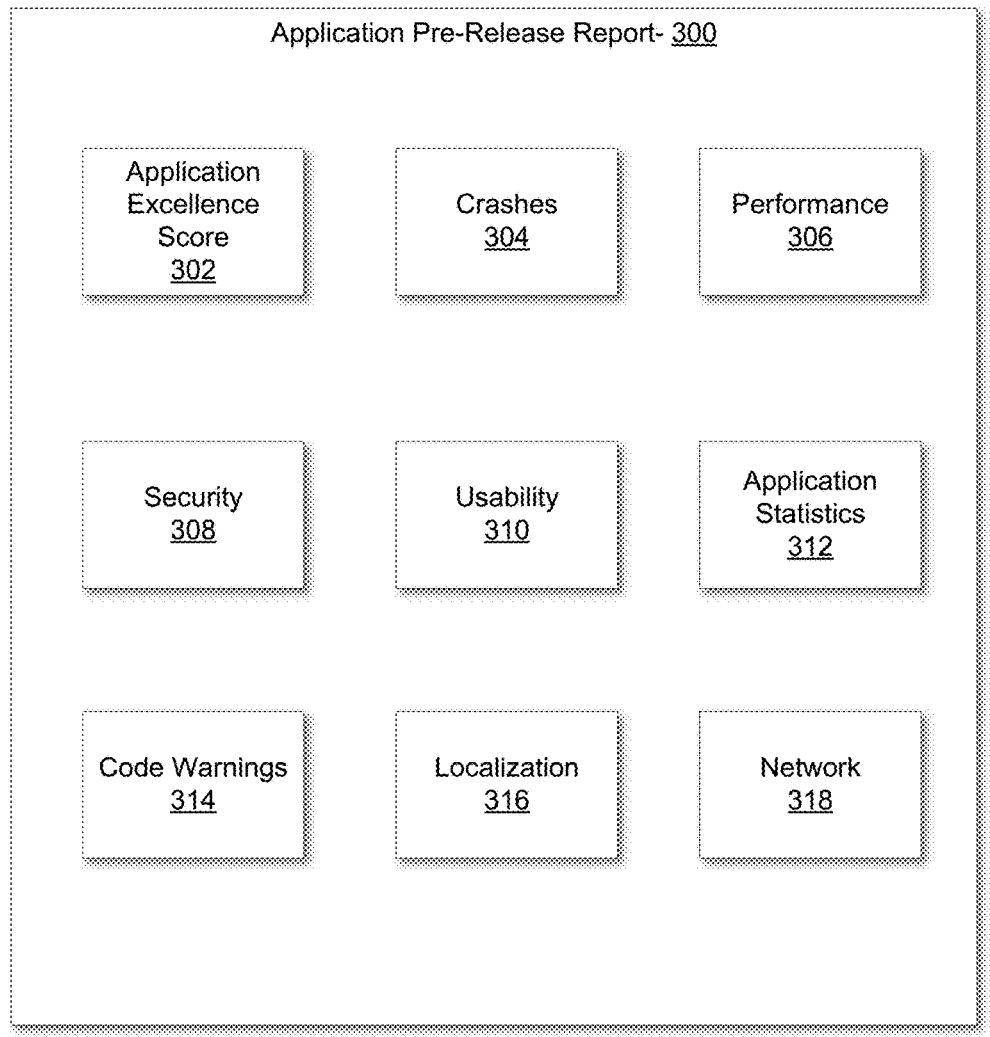
FIG. 3 is an illustration of an example application pre-release report structure in accordance with one or more embodiments.

FIG. 3 illustrates an example structure of an application pre-release report 300 that includes a number of different categories. The report structure and each of its categories is presented by way of a user interface, each of which provides an application developer information about the performance of an application that they developed. The categories include, by way of example and not limitation, an application excellence score 302, crashes 304, performance 306, security 308, usability 310, application statistics 312, code warnings 314, localization 316, and network 318. The discussion below describes each of these categories and then provides an implementation example of a user interface that can be used to present at least some of the categories.

Application Excellence Score

The application excellence score provides an overall score for an application that has been analyzed. The application excellence score can provide a visual indication, such as 1-5 stars, as a measure of how the application performed. This enables the application developer to ascertain, at a high level, how his or her application generally performed during evaluation.

Crashes

The Crashes category provides a crash investigation report which shows an application developer information as to why an application crashed and suggested remedial measures to fix any associated problems. This information can be developed by a robot that crawls the application, as described above. User interface elements in this report can include the following:

Device Specification Data (modeling, CPU type, RAM, display size, . . . )

Stack trace for all crashes found in a test run each stack trace has a "jump to crash" button, which moves the semantic timeline/screenshots/log to the moment of the crash.

each stack trace has a "show repro steps" button which opens a pop up which shows the minimum possible path of clicks through an application to get to the moment that an analysis robot surfaced the crash.

Graphical information on how the analysis robot crawled the application including:

semantic timeline showing each step's activity and the interaction event that loaded this timeline;

the corresponding screenshot that matches the selected point in the timeline;

an option to open a pop up with a streaming video of the entire robot's run through the application.

Log the log is an embedded scrolling display that jumps to the associated part of the log as the user selects entries in the semantic timeline.

Device health information memory

RAM

Examples of information that can be conveyed in the crash investigation report include:

Example: "NullPointerException in com.company.MainActivity.onResume( )"

Example: "FileNotFoundException in com.company.MyService.doStuff( ): "local.dat not found"

Performance

The Performance category provides a detailed device-test report and provides an application developer, for a given run of their application on a particular device, all of the information to enable the developer to work on performance problems like out-of-memory exceptions. The performance report provides a timeline that shows how the start time of the device changes over time. In one or more embodiments, the primary interface is a series of "swim lane" graphs on a common time axis including:

Device specification data (model name, CPU type, RAM, display size, . . . )

CPU memory network

FPS share report link

The performance report also provides an overdrawn analysis. Overdrawn analysis ranks activities by the amount of overdraw the activities have, and prioritizes by worst-first. The user interface can include color-tinted screenshots, similar to an on-device overdraw overlay, to show where the overdraw occurs.

Examples of information that can be conveyed in the performance report include:

Example: "Slow method: com.company.MainActivity.onCreate( ) took 500 ms."

Example: "Excessive allocation: Method com.company.CustomView.onDraw( ) creates 60 new objects and ran 4000 times."

Example: "Framerate/jank: Activity com.company.MainActivity dropped 25% of frames"

Example: "Framerate/jank: Activity com.company.MainActivity froze for 400 ms"

Example: "Overdraw: Activity com.company.MainActivity redrew 25% of screen 4 times per frame"

Example: "Activity leak: Activity com.company.MainActivity leaked for 20 s; could cause memory problems"

Security

The Security category can provide information associated with vulnerability scans and can provide a list of issues along with severity information. The vulnerability scan can look for various vulnerabilities such as:

Detect use of bad libraries exposed private keys improper SSL

JavaScript injection and penetration tests unsafe local data storage—in external SD card, unencrypted storage, etc.

application sandbox usage

The Security category can also perform various policy checks and look for API violations. With respect to the list of issues and accompanying severity information, one example of such a list can have the following categories:

Critical

Exploitation very likely; damage would be considerable

Example: the application has access to contacts and photos on the phone and is using a version of OpenSSL that is vulnerable to Heartbleed.

High

Exploitation is possible, but not likely; damage would be considerable

Example: the application has access to contacts and messages on the phone and is communicating over the Internet using cleartext traffic.

Moderate

Exploitation is theoretically possible; damage would be contained or minimal.

Example: the application is vulnerable to SQL injection

Low

Exploitation would have a very minor impact

Example: the application does not explicitly specify android:exported for all activities in its manifest, which could become an attack vector on older devices.

For each issue listed, the user interface can include a description of the vulnerability, steps to remedy the vulnerability (e.g., if the issue is an outdated library, a required code snippet to update dependencies can be shown), and links to articles or other references that discuss the vulnerability. In addition, the Security category provides an ability to flag an issue to a Security team as a false positive for this application.

The Security category also provides a timeline of issues over the most recent application versions and can enable notifications to be sent to developers to revisit a pre-release report when a new vulnerability has been added to the system. This provides an updated version with a new issue included. The Security category can also provide links to various security articles to help developers understand the particular issue and how to fix it. In addition, an ability can be provided to mark moderate-to-low issues as not relevant to a particular application. This enables demotion of issues to "minimal" severity and moves these issues to the bottom of the list of issues with a particular application.

In at least some embodiments, when a critical issue is found with a particular application, a notification can be sent to the developer that a critical issue has been found. The developer can then click on the notification and be navigated to a deep link inside the pre-release report to acquire more information about the critical issue. The pre-release report user interface can then be updated to display all new issues and highlight the relevant issue in the user interface that triggered the notification.

Usability

The Usability category enables developers to see screenshots taken during evaluation tests to provide rich visual information to inform the developer of usability issues associated with the evaluation of their application. The Usability category can enable screenshots to be displayed for all devices on which the various tests were run. This category also allows for filters for devices based on device, version, country, and the like. Screenshots can be surrounded with the corresponding device frame. In one or more embodiments, a selected device can be displayed in a main view and scrolling can be allowed through the screenshots corresponding to the execution flow and timeline. All other devices can be shown on a grid below the main view. Screenshots from all devices can be displayed on the screen, matched by a screen ID. The screenshots can show the same state on all devices. This way, users will be able to compare the same state of their application across devices.

An execution flow view can show graphical information on how the robot crawled the particular application. This can include a semantic timeline showing each step's activity and the interaction event that loaded this timeline, the corresponding screenshot that matches the selected point in the timeline, an option to open a pop-up with a streaming video of the entire robot's run through the application, highlighted elements that were clicked by the robot to navigate to various screens, and a table with performance statistics having a highlight around the statistics related to the screenshot in focus.

The Usability category can also provide the information associated with accessibility. For example, the user interface can include a table with all accessibility issues related to the selected device. Clicking on a particular issue from one of the tables will highlight the element of the layout on the screenshot the issue is related to. Hovering with the cursor over the element of the layout from the screenshot highlights the issue caused by the element. Accessibility can also bring into consideration various dependency options (e.g., passing accessibility node information during the crawl time, feeding in the dumped artifacts to run the accessibility check during post-process).

The Usability category can also include information associated with the layout and user interface of a particular application under test. This can automatically identify user interface issues. During this phase of testing, screenshots can be analyzed to ascertain whether any user interface issues exist. In the execution flow, a table can be presented with all the user interface issues captured that are related to the selected device. Clicking on a particular issue from one of the tables will highlight the element of the layout on the screenshot that issue is related to. Hovering the cursor over the element of the layout from the screenshot highlights the issue caused by the element.

Examples of information that can be conveyed include:
Example: "Accessibility: On activity com.company.MainActivity, "Cancel" button cannot be reached via a directional controller, such as a trackball or 0-pad"
Example: "Accessibility: On activity com.company.MainActivity, "OK" button text does not appear on metadata"
Example: "User Interface issue: On activity com.company.MainActivity, Button "OK" and button "Cancel" have an visible overlap on 6 device models"
Example: "User Interface issue: On activity com.company.MainActivity, Text "Description" has a horizontal truncation on "fr" locale Application Statistics The Application statistics category can show differences in size from previously uploaded applications and a breakdown of which parts of the application contributed to the overall size. In this category, application size can be shown over time with a breakdown of the size by types of files: dex size (detect any code optimization techniques were used), native code, images (detect unused images, perform analysis on images to ascertain whether more optimal formats exist), sound, layout, strings.

The Application statistics category can show added library dependencies, permission changes, and offer possible tips to developers dealing with issues such as compression, optimizing PNGs, replacing PNGs with WEBP, native libraries and whether such should be uncompressed for performance reasons, detecting image issues such as image densities that may be unpopular in a particular application's user base, and the like.

The Application statistics category can also detail ProGuard usage, whether particular services relied on by the application are out of date, and can calculate and show actual delta update size as delivered to existing users' devices.

Examples of information that can be conveyed include:
Example: "APK size increased 24% from 4.2 MB to 5.5 MB"
Example: "DEX methods referenced increased 20% from 40,000 to 48,000 (17,536 remaining)"
Example: "Total APK size could be reduced by 10%"

Code Warnings

The Code warnings category can identify potential problems in code, as well as provide statistical analysis of the application. Code warnings can identify such things as missing or unused translations, unused resources, icon problems (such as missing densities, duplicate icons, wrong sizes, and the like). Code warnings can also provide information on call graph analysis and identify potential blocking methods called on a main thread.

Examples of information that can be conveyed include:
Example: "Security: Using a fixed seed with SecureRandom"
Example: "MainActivity.onStart( ) missing super call"
Example: "Main thread method MainActivity. onResume( ) may call blocking method File.open( )"

Localization

The Localization category can enable developers to ascertain whether various translations are correct or whether there are missing translations.

Examples of information that can be conveyed include:
Example: On activity com.company.MainActivity, "SAT." is translated into wrong message "Saturday"
Example: "Destination" is not translated into German, but is translated for Japanese
Example: The Chinese translation of "Everest" is too long to fit into the space.

Network

The Network category can enable developers to build applications that are performant and optimized for poor network conditions. This can include use of caching and performant network libraries, analyzing the number of network calls made and the associated payload, off-line handling, and low bandwidth use when the network is poor.

Example Report User Interface

Figure 4:
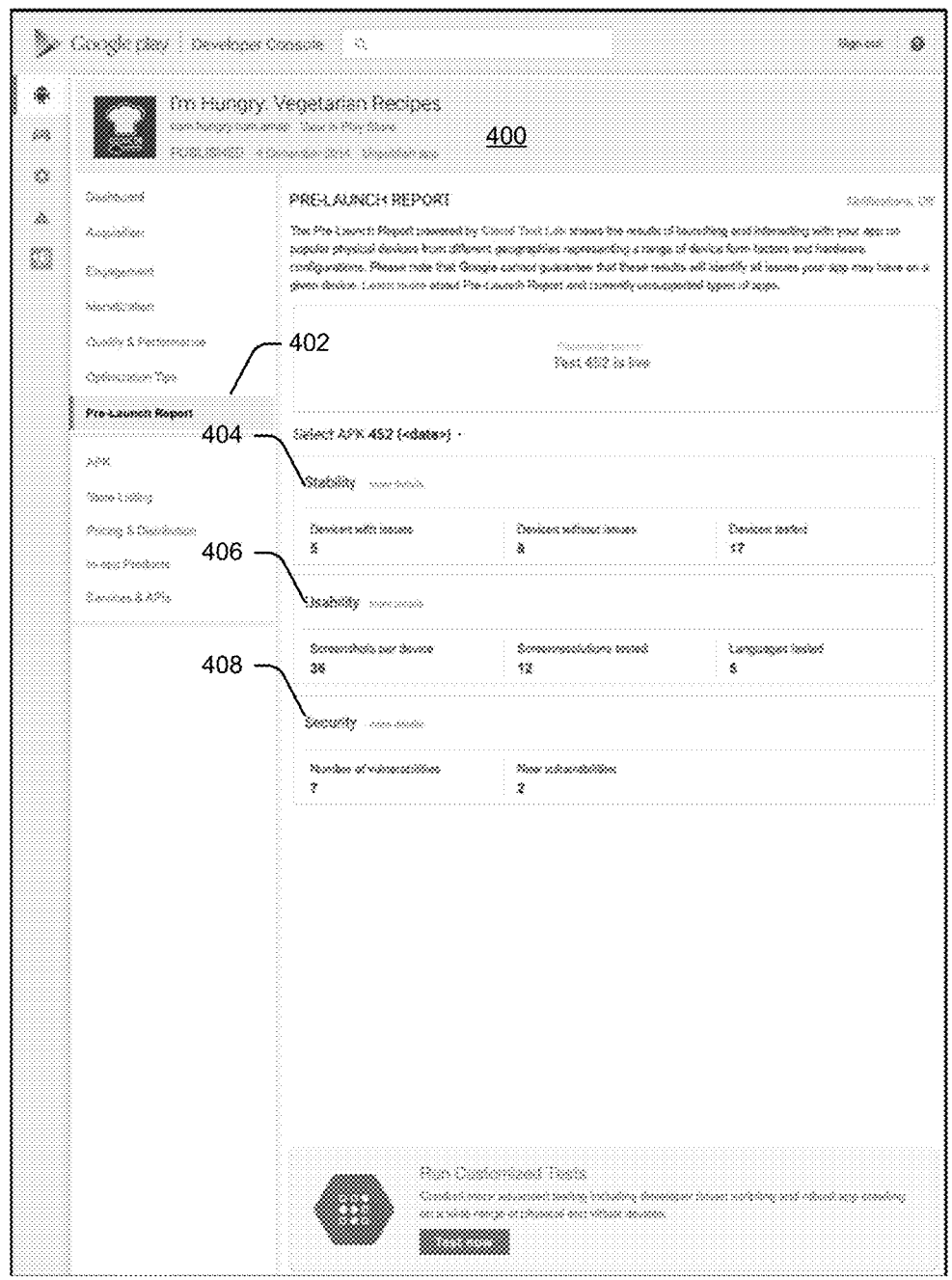
FIG. 4 is an example user interface in accordance with one or more embodiments.

As noted above, Report module 206 (FIG. 2) is representative of functionality that receives information from both the static analysis module 200 and dynamic analysis module 204, and creates a robust, informative and comprehensive report for application developers. The report, which is interactive and accessible over a network, enables application developers to review analysis results broken down into various different categories. Each category is then further broken down to convey information at different levels of granularity that are useful for the application developer to understand. The report is presented in an intuitive, easy-to-navigate user interface that guides the developer through the analysis results. The report, an example structure of which is described just above, is presented through an easily-navigable user interface experience. As an example, consider FIG. 4 which shows an application pre-release report, designated "Pre-Launch Report" generally at 400. A clickable tab 402 enables a user to access the report.

In this example, one of the first pages of the report provides a general overview of the analysis that took place. In this particular example, the overview includes a Stability section 404, a Usability section 406, and a Security section 408.

The Stability section 404 provides an overview of how many devices had issues with the application under test, how many devices did not have issues with the application under test, and how many devices total were tested. The Usability section 406 provides an overview of how many screenshots per device, the screenshot resolutions tested, and the languages tested. The Security section 406 provides an overview of the number of vulnerabilities and of those, which vulnerabilities were new. More information for each section can be ascertained by clicking a "more details" link which enables the application developer to drill down, in even more detail, on content within each section.

Figure 5:
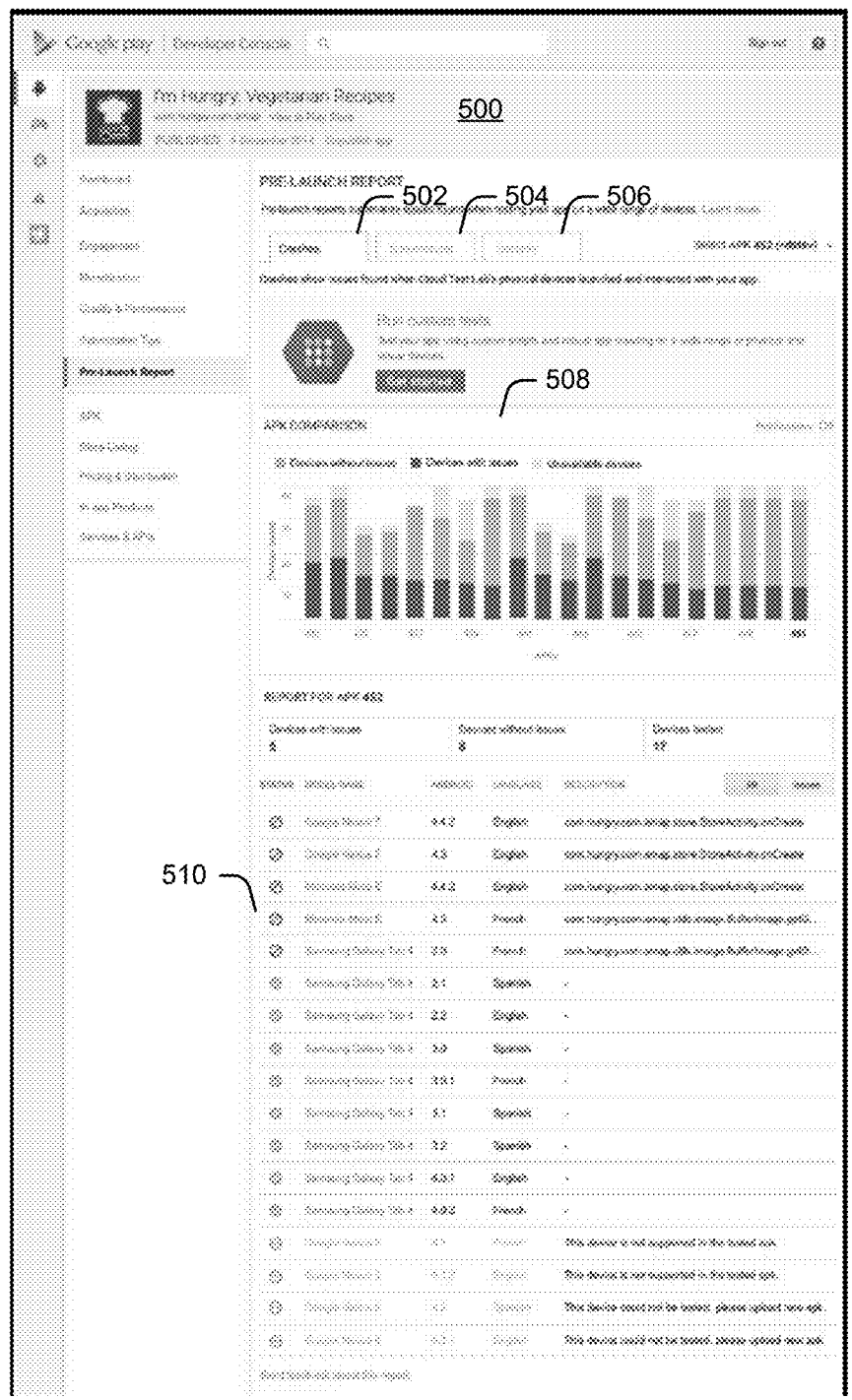
FIG. 5 is an example user interface in accordance with one or more embodiments.

FIG. 5 shows another page 500 of the report which enables a user to access various report categories which provide additional information regarding an application's testing. In this particular example, user interface instrumentalities 502, 504, and 506 enable a user to access various categories (i.e., crashes, screenshots, and security, respectively) associated with an application's testing. Although only three categories are shown, it is to be appreciated and understood that other categories, such as those categories described above, as well as other additional categories can be provided without departing from the spirit and scope of the description.

In this particular example, the user has selected "Crashes". Responsive to the user's selection, a report section 508 is displayed and provides a visual summary of the device testing. Here, color-coded bars indicate the devices with issues, the devices without issues, and devices that were unavailable. A report section 510 provides more granular information including, by way of example and not limitation, status information, device model name, operating system version, language, and a description associated with a particular crash.

Figure 6:
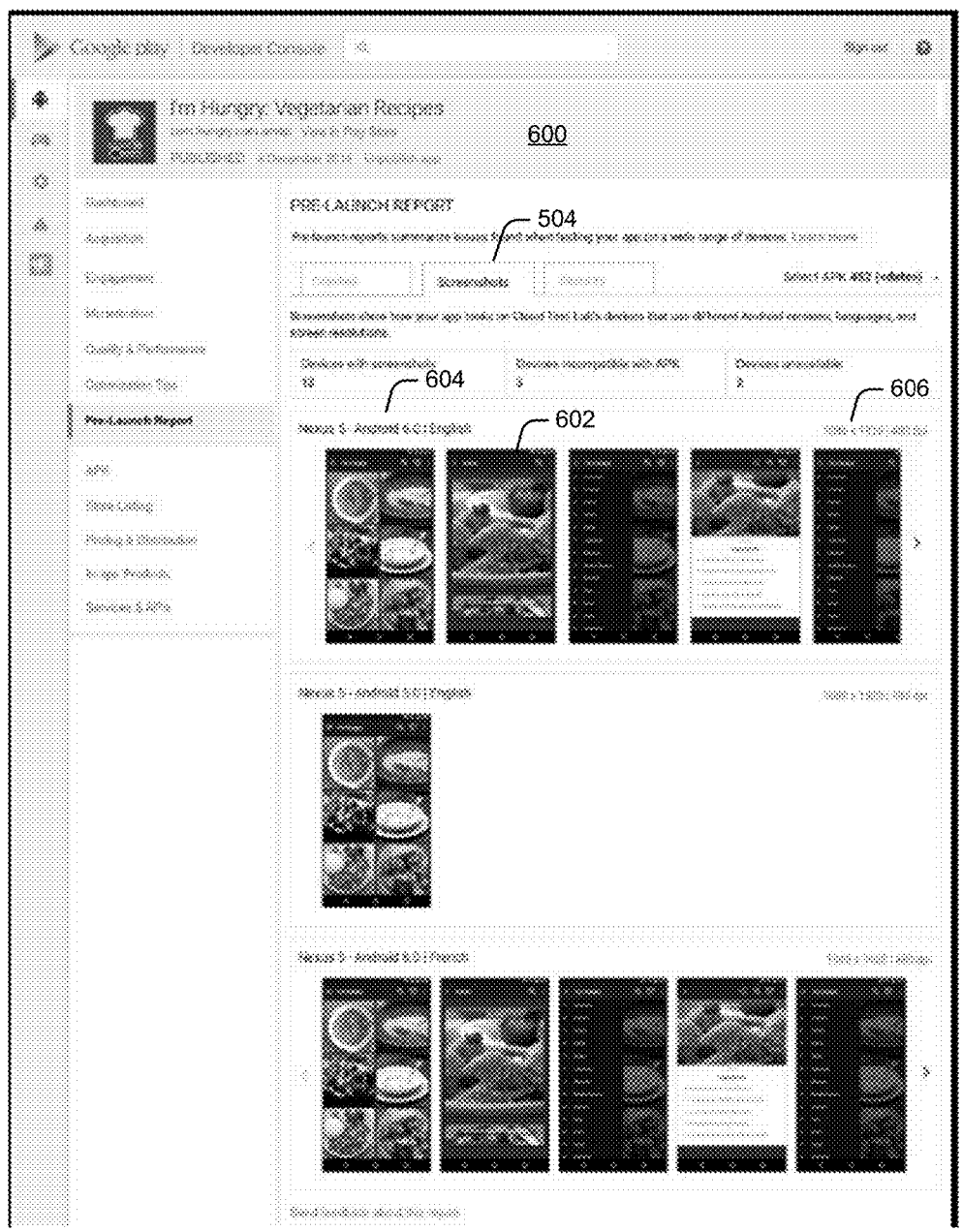
FIG. 6 is an example user interface in accordance with one or more embodiments.

FIG. 6 shows another page 600 of the report which enables a user to see various screenshots which summarize issues found when an application was tested. Here, the user has selected user interface instrumentality 504 to access the screenshot report. Here, a number of screenshots, an example of which is shown at 602, are presented to the user. On this report page, the device name and operating system version is shown at 604, as well as the language that the device was configured with during test. In addition, the screen size of each device and screen resolution are illustrated at 606. Presenting visual information in this manner, along with the device name, operating system version, language, and screen size and resolution provides developers with an easy visual comparison across the devices. The developer can easily ascertain how their application looks and feels in different languages and on different devices. Accessibility issues can be addressed by enabling the developer to ascertain, either by clicking on a particular screenshot or device, or on some other user interface instrumentality, any accessibility issues associated with their application. In addition, screenshots can also be used to flag potential visual issues such as overlay issues in a particular design where, for example, buttons may undesirably overlay one another. By having screenshots, a developer's attention can be immediately directed to any such potential problem.

Figure 7:
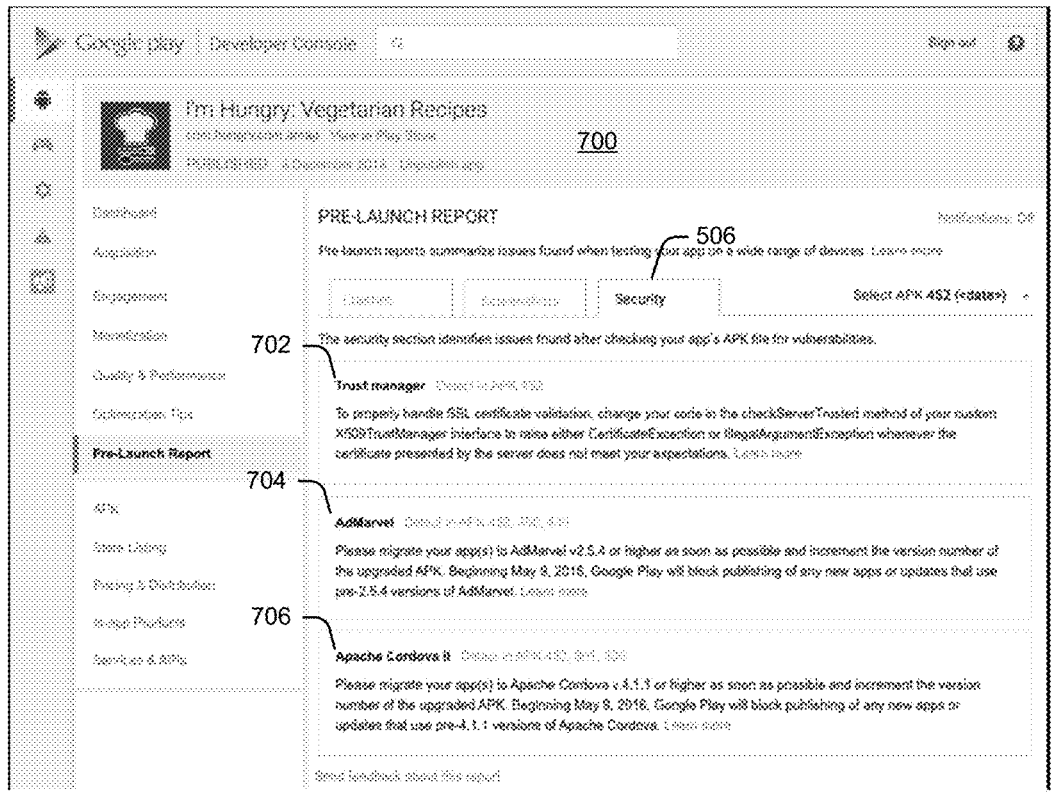
FIG. 7 is an example user interface in accordance with one or more embodiments.

FIG. 7 shows another page 700 of the report which enables a user to learn of various issues associated with the security of their application. That is, by clicking on the user interface instrumentality 506, the user can be exposed to a report page that provides them not only information about security issues associated with their application, but an opportunity to "learn more" to ascertain, for example, remedial measures that might be employed. In this particular example, three particular issues 702, 704, and 706 have been identified. Additionally, information associated with these issues has been provided so that the application developer can take appropriate action.

Each of the categories described in connection with FIG. 3 can have their own separate report page, like the ones just described, which provides more granular information about the category and how an application performed under test. This provides the application developer with a one-stop report location where they can quickly and conveniently access information associated with their application prior to its release. In some instances, an application developer can upload their application and, within an hour before publishing the application, can be provided with a report identifying any potential issues. This can greatly assist developers in making a decision as to whether release their application as originally intended, or address any issues prior to release.

Having considered an example user interface, consider now an example method in accordance with one or more embodiments.

Example Methods

Figure 8:
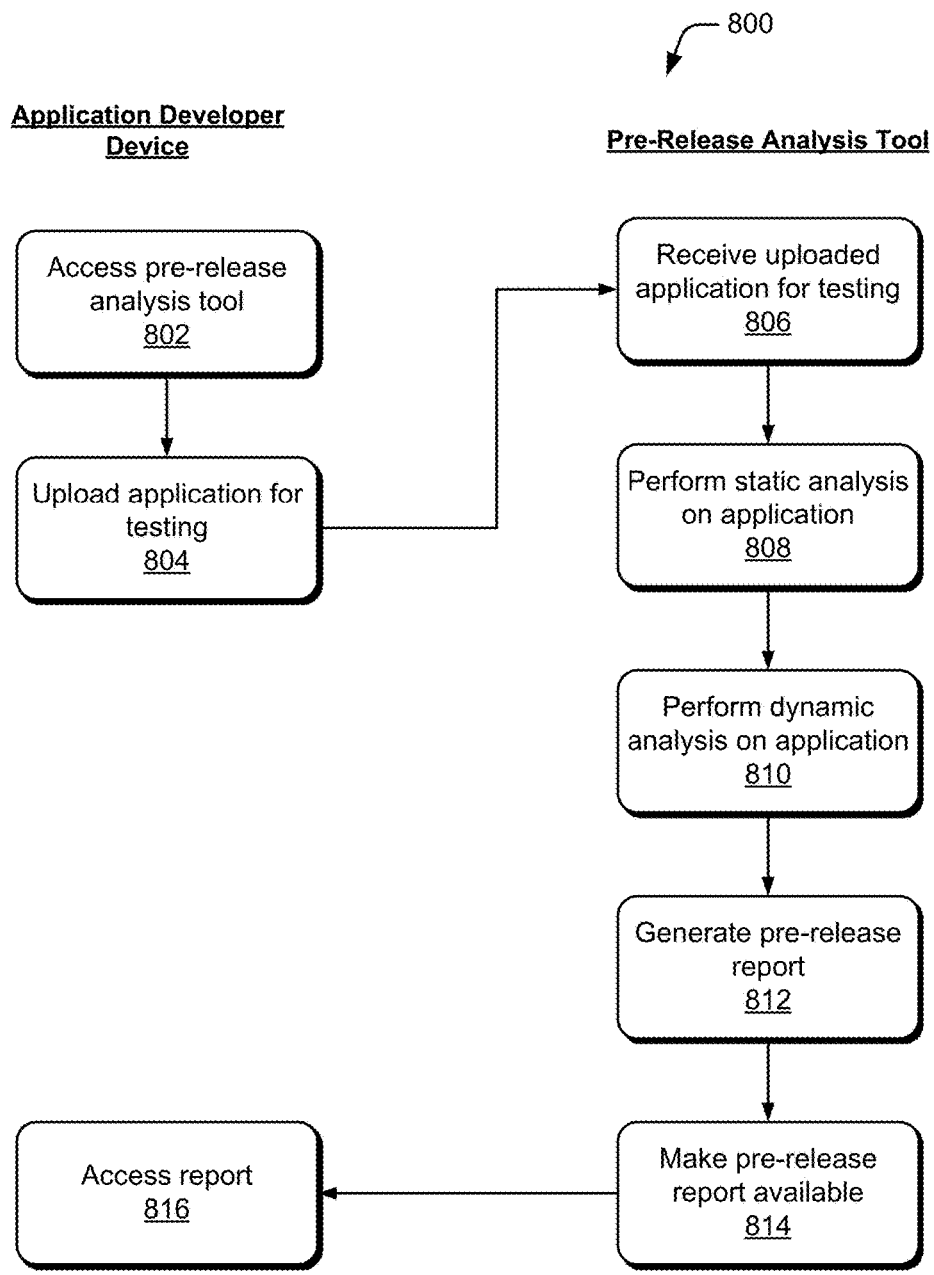
FIG. 8 is a flow diagram that describes steps in a method in accordance with one or more embodiments.

FIG. 8 illustrates an example method 800 through which an application, such as a mobile app, can be tested in an automated fashion. This method is shown as sets of blocks that specify operations performed but are not necessarily limited to the order or combinations shown for performing the operations by the respective blocks. The techniques are not limited to performance by one entity or multiple entities operating on one device. In addition, the method is described using two columns, one of which is designated "Application Developer Device", and another of which is designated "Pre-Release Analysis Tool." This is done to depict the entities that perform various operations under the method. The method can be implemented in connection with any suitable hardware, software, firmware, or combination thereof.

At block 802, an application developer's device accesses a pre-release analysis tool. In this example, the application developer has developed an application, such as a mobile app, and wishes to have the application analyzed prior to its release. Access to the pre-analysis tool can take place in any suitable manner. For example, the pre-analysis tool or aspects of the tool can be located on the application developer's device. Alternately or additionally, the pre-analysis tool can be located remotely from the application developer's device and can be accessible by way of a network, such as the Internet. At block 804, the application is uploaded for testing.

At block 806, the pre-release analysis tool receives the uploaded application for testing. The pre-release analysis tool can process the application and, at block 808, perform static analysis on the application. Examples of how this can be done are provided above. At block 810, dynamic analysis is performed on the application. Examples of how this can be done are provided above. For example, the application can be loaded onto a number of virtual or physical devices and an automated robot tester can test the application as described above. At block 812, a pre-release report is generated and, at block 814 made available to the application developer. Example reports and report formats are provided above. This can be done in any suitable way. For example, in at least some embodiments, the pre-release report is web accessible and can be accessed by the application developer at any suitable time.

At block 816, the application developer's device accesses the report and enables the application developer to consume the report's content.

Example Computing System

Figure 9:
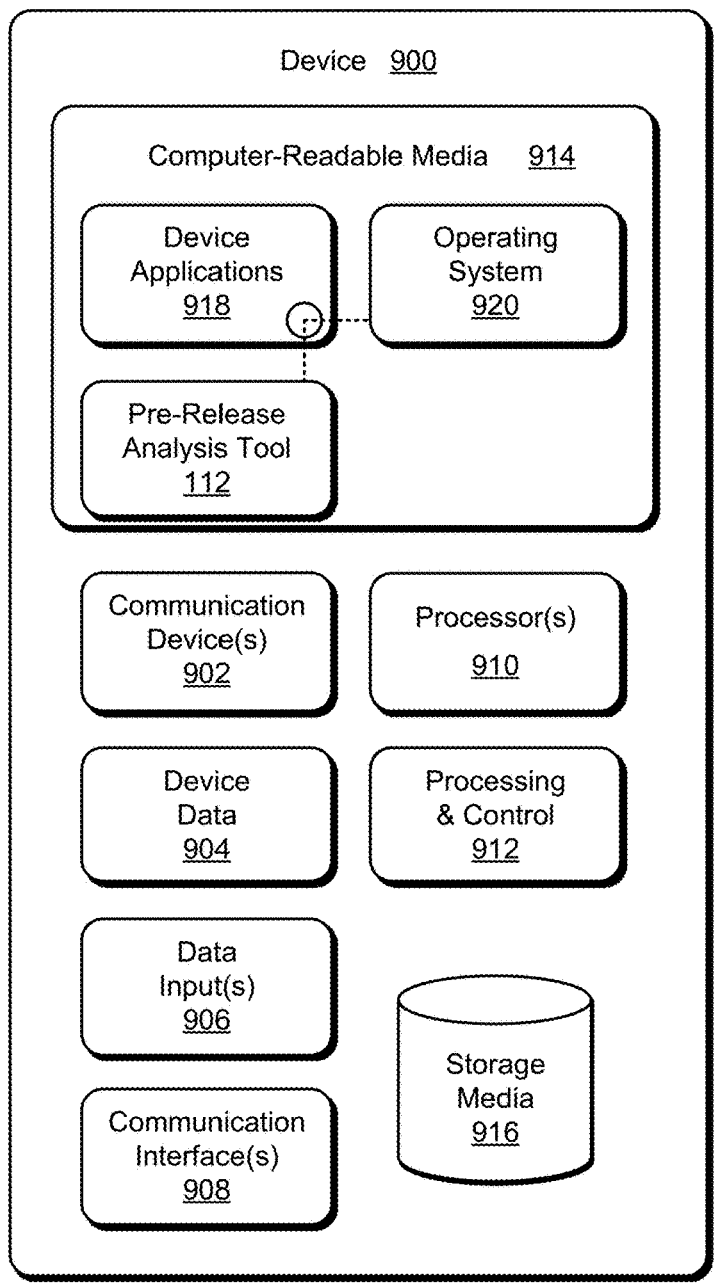
FIG. 9 illustrates various components of an example computing system that can be implemented as any type of client, server, and/or computing device as described with reference to the previous FIGS. 1-8 to implement the embodiments described herein.

FIG. 9 illustrates various components of an example computing system 900 that can be implemented as any type of client, server, and/or computing device as described with reference to the previous FIGS. 1-8 to implement the embodiments described herein. In embodiments, computing system 900 can be implemented as any suitable type of computing device including a System-on-Chip (SoC), and/or as another type of device or portion thereof.

Computing system 900 includes communication devices 902 that enable wired and/or wireless communication of device data 904 (e.g., received data, data that is being received, data scheduled for broadcast, data packets of the data, etc.). Device data 904 or other device content can include configuration settings of the device, media content stored on the device, and/or information associated with a user of the device. Media content stored on computing system 900 can include any type of audio, video, and/or image data. Computing system 900 includes one or more data inputs 906 via which any type of data, media content, and/or inputs can be received user-selectable inputs (explicit or implicit), messages, music, television media content, recorded video content, and any other type of audio, video, and/or image data received from any content and/or data source.

Computing system 900 also includes communication interfaces 908, which can be implemented as any one or more of a serial and/or parallel interface, a wireless interface, any type of network interface, a modem, and as any other type of communication interface. Communication interfaces 908 provide a connection and/or communication links between computing system 900 and a communication network by which other electronic, computing, and communication devices communicate data with computing system 900.

Computing system 900 includes one or more processors 910 (e.g., any of microprocessors, controllers, and the like), which process various computer-executable instructions to control the operation of computing system 900 and to enable techniques described herein. Alternatively or in addition, computing system 900 can be implemented with any one or combination of hardware, firmware, or fixed logic circuitry that is implemented in connection with processing and control circuits which are generally identified at 912. Although not shown, computing system 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 900 also includes computer-readable media 914, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 800 can also include a mass storage media device 916.

Computer-readable media 914 provides data storage mechanisms to store device data 904, as well as various device applications 918 and any other types of information and/or data related to operational aspects of computing system 900. For example, an operating system 920 can be maintained as a computer application with computer-readable media 914 and executed on processors 910. Device applications 918 may include a device manager, such as any form of a control application, software application, signal-processing and control module, code that is native to a particular device, a hardware abstraction layer for a particular device, and so on.

Device applications 918 also include any system components, engines, or managers to implement the techniques described herein. In this example, device applications 918 include pre-release analysis tool 112, as described above.

CONCLUSION

Various embodiments provide an automated testing analysis tool, termed a "pre-release analysis tool", that tests applications for functional and nonfunctional requirements. In at least some embodiments, the pre-release analysis tool can perform both static analysis and dynamic analysis on an application. A report module can provide rich feedback, including actionable feedback, to an application developer in order to enable the developer to make their applications more secure, reliable, efficient, and performant Actionable feedback can include feedback that suggests various remedial measures that an application developer may put in place in order to improve their applications.

Application analysis can be performed in various different categories with actionable feedback provided in each. These different categories can include, by way of example and not limitation, application crashes, performance, security, usability, application statistics, code warnings, localization issues, and network issues.

Although embodiments of techniques using, and objects including, attaching electronic components to interactive textiles have been described in language specific to features and/or methods, it is to be understood that the subject of the appended claims is not necessarily limited to the specific features or methods described. Rather, the specific features and methods are disclosed as example implementations of attaching electronic components to interactive textiles.

What is claimed is:

1. A computer-implemented method for generating an application report for an application, the method comprising:
    receiving the application;
    performing a static analysis of the application;
    performing a dynamic analysis of the application by loading the application onto a plurality of devices and using an automated robot tester to walk through the application on each of the devices via inputs to the application that are generated by the automated robot tester; and
    generating the application report based on the static and dynamic analysis, the application report comprising:
        responsive to the automated robot tester causing a crash of the application on one of the devices during the dynamic analysis, one or more of the inputs to the application that the automated robot tester performed to cause the crash of the application; and
        responsive to determining a security vulnerability of the application by either the static or dynamic analysis, information describing the security vulnerability of the application.

2. The method of claim 1, wherein the application report further comprises a summary of the devices including device model name, operating system version, and language.

3. The method of claim 1, wherein the application report further comprises a screenshot of the application on one of the devices.

4. The method of claim 3, wherein the screenshot describes the crash of the application.

5. The method of claim 1, wherein the application report further comprises a performance problem experienced by the automated robot tester during the dynamic analysis that is separate and distinct from the crash of the application and the security vulnerability.

6. The method of claim 1, wherein the information describing the security vulnerability comprises severity information and information to remedy the security vulnerability.

7. The method of claim 6, wherein the information to remedy the security vulnerability comprises a link to an article about the security vulnerability.

8. The method of claim 1, wherein the application report further comprises a usability problem that is separate and distinct from the crash of the application and the security vulnerability.

9. The method of claim 8, wherein the usability problem comprises a problem with a layout or user interface of the application on one of the devices.

10. The method of claim 9, wherein the application report includes a screenshot of the layout or the user interface.

11. The method of claim 1, wherein the application report further comprises statistics of the application that are separate and distinct from the crash of the application and the security vulnerability.

12. The method of claim 1, wherein the application report further comprises a potential problem in the code of the application that is separate and distinct from the crash of the application or the security vulnerability.

13. The method of claim 1, wherein the application report further comprises a missing or wrong translation of text on one of the plurality of devices.

14. The method of claim 1, wherein the inputs are determined based upon a depth-first search approach that determines possible inputs that may cause the application to crash.

15. A system comprising:
    one or more processors;
    one or more computer readable storage media devices embodying computer readable instructions which, when executed by the one or more processors, cause the one or more processors to perform operations comprising:
    receiving an application;
    performing a static analysis of the application;
    performing a dynamic analysis of the application by loading the application onto a plurality of devices and using an automated robot tester to walk through the application on each of the devices via inputs to the application that are generated by the automated robot tester; and
    generating an application report based on the static and dynamic analysis, the application report comprising:
        responsive to the automated robot tester causing a crash of the application on one of the devices during the dynamic analysis, one or more of the inputs to the application that the automated robot tester performed to cause the crash of the application; and
        responsive to the static analysis or the dynamic analysis determining a security vulnerability of the application, information describing the security vulnerability of the application.

16. The system of claim 15, wherein the application report further comprises a summary of the devices including device model name, operating system version, and language.

17. The system of claim 15, wherein the application report further comprises a screenshot that describes the crash of the application.

18. The system of claim 15, wherein the application report further comprises a performance problem experienced by the automated robot tester during the dynamic analysis that is separate and distinct from the crash of the application and the security vulnerability.

19. The system of claim 15, wherein the inputs are determined based upon a depth-first search approach that determines possible inputs that may cause the application to crash.

20. The system of claim 15, wherein the application report further comprises a problem with a layout or user interface of the application on one of the devices.

* * * * *